(12) United States Patent
Miao

(10) Patent No.: US 11,192,724 B2
(45) Date of Patent: Dec. 7, 2021

(54) INCLINED SHAFT CONTINUOUS FEEDING SYSTEM FOR SOLID FILLING MATERIALS

(71) Applicant: Xiexing Miao, Xuzhou (CN)

(72) Inventor: Xiexing Miao, Xuzhou (CN)

( * ) Notice: Subject to any disclaimer, the term of this patent is extended or adjusted under 35 U.S.C. 154(b) by 381 days.

(21) Appl. No.: 16/254,618

(22) Filed: Jan. 23, 2019

(65) Prior Publication Data
US 2020/0040729 A1  Feb. 6, 2020

(30) Foreign Application Priority Data
Aug. 2, 2018  (CN) .......................... 201810869741.1

(51) Int. Cl.
| | |
|---|---|
| *B65G 35/06* | (2006.01) |
| *B61B 13/10* | (2006.01) |
| *B61D 11/02* | (2006.01) |
| *E21F 15/06* | (2006.01) |
| *B61B 13/12* | (2006.01) |
| *E21F 17/18* | (2006.01) |

(52) U.S. Cl.
CPC .............. *B65G 35/06* (2013.01); *B61B 13/10* (2013.01); *B61B 13/127* (2013.01); *B61D 11/02* (2013.01); *E21F 15/06* (2013.01); *E21F 17/18* (2013.01)

(58) Field of Classification Search
CPC ......... E21F 15/06; E21F 13/063; E21F 13/06; E21F 13/068; E21F 13/08; E21F 13/02; E21F 17/16; E21F 13/04; B61B 13/10; B61B 9/00; B61B 13/127; B61D 11/02; B61D 19/001; B61D 11/00; B61D 7/02; B65G 35/06

USPC ........................................................ 104/173.1
See application file for complete search history.

(56) References Cited

U.S. PATENT DOCUMENTS

| | | | | |
|---|---|---|---|---|
| 545,319 | A | * | 8/1895 | Duzer ....................... B61B 9/00 |
| | | | | 104/173.1 |
| 1,761,145 | A | * | 6/1930 | Morgan ................ E21F 13/063 |
| | | | | 198/510.1 |
| 3,307,493 | A | * | 3/1967 | Keller .................... B65G 21/14 |
| | | | | 104/172.1 |

(Continued)

FOREIGN PATENT DOCUMENTS

| | | | |
|---|---|---|---|
| CN | 103334784 A | * | 10/2013 |
| CN | 103334784 A | | 10/2013 |

(Continued)

*Primary Examiner* — Zachary L Kuhfuss
*Assistant Examiner* — Cheng Lin
(74) *Attorney, Agent, or Firm* — Bayramoglu Law Offices LLC

(57) ABSTRACT

An inclined shaft continuous feeding system for solid backfilling materials includes a surface loading system, an inclined shaft transportation system, and a downhole unloading system. The inclined shaft transportation system is arranged between the surface loading system and the underground unloading system. The inclined shaft transportation system includes a bottom unloading dumper, support guide wheels, a guide rail, a drive wheel, a reverse wheel, and a traction steel wire rope configured between the drive wheel and the reverse wheel. The present invention can realize a steady, continuous and efficient transportation of the solid backfilling materials from the surface to down hole. Moreover, the material transportation system does not wear easily, has long service life and low material transportation cost.

17 Claims, 2 Drawing Sheets

(56) References Cited

U.S. PATENT DOCUMENTS

| | | | | | |
|---|---|---|---|---|---|
| 5,163,545 | A | * | 11/1992 | David | B65G 41/02 |
| | | | | | 198/588 |
| 2006/0162608 | A1 | * | 7/2006 | Dibble | B65G 35/06 |
| | | | | | 104/96 |
| 2017/0320505 | A1 | * | 11/2017 | Fisk | B61L 25/023 |

FOREIGN PATENT DOCUMENTS

| | | | | |
|---|---|---|---|---|
| CN | 104670245 | A | * | 6/2015 |
| CN | 108005717 | A | * | 5/2018 |

* cited by examiner

INCLINED SHAFT CONTINUOUS FEEDING SYSTEM FOR SOLID FILLING MATERIALS

CROSS REFERENCE TO THE RELATED APPLICATIONS

This application is based upon and claims priority to Chinese Patent Application No. CN201810869741.1, filed on Aug. 2, 2018, the entire contents of which are incorporated herein by reference.

TECHNICAL FIELD

The present invention relates to an inclined shaft continuous feeding system for solid filling materials, in particular to a material feeding system for transporting solid filling materials above the ground to the underground, which is applied in the solid backfilling mining of coal mines and metal mines.

BACKGROUND

As the solid backfilling coal mining technology becomes mature and widely used, a reasonable design for the feeding system for solid filling materials becomes more and more important. How to safely, efficiently and economically transport solid filling materials above the ground to several hundred meters or even thousands of meters underground for backfilling operation is a major problem in the development of the fully-mechanized solid backfilling coal mining technology.

Although the existing vertical continuous feeding system is relatively well-developed, it still has some deficiencies. Namely, since the self-weight of the suspending steel cable for the vertical feeding system and the load carried by the steel cable etc. act vertically on the steel cable, the suspending steel cable is overloaded and prone to damage, it is difficult to ensure the strength of the suspending steel cable, and the maintenance and replacement are inconvenient, etc. will be caused. Also, the situations like the system operates unsteadily in the process of material feeding, and the material feeding is inefficient, etc. will be caused.

In order to reduce the load carried by the suspending steel cable and realize the efficient and continuous feeding of the solid backfilling materials, a published application CN201310301172, entitled a solid backfilling inclined feeding method, discloses that the inclined shaft is built in the direction towards the mining coal seam. A material feeding channel is installed in the inclined shaft. A stock bin connected to the outlet of the inclined shaft is built above the transportation alley, and a feeding machine connected to the feeding belt conveyor is disposed at the outlet of the stock bin. When the material is fed through the inclined shaft, the solid backfilling material is rapidly sent into the stock bin under the action of the vibration motor, then it falls down on the feeding belt conveyor via the feeding machine, and ultimately is transported by the feeding belt conveyor to the coal mining working face. Although with this method, the solid backfilling material is able to slide down rapidly, and the speed is controllable in real time, which can avoid the defects of the vertical feeding system. This method still has the following deficiencies: it is difficult to make multiple vibration motors vibrate synchronously; the material transportation system has a poor operation stability, which is adverse to material transportation; the feeding channel is prone to wear and tear; frequent maintenance and replacement are required; the service life is short; and the material transportation costs are increased.

SUMMARY

In order to overcome the above-mentioned deficiencies of the prior art, the present invention provides an inclined shaft continuous feeding system for solid backfilling materials, which is capable of steadily, continuously, and efficiently transporting the solid backfilling materials above the ground to a location underground. Moreover, the material transportation system does not wears easily, has a long service life and a low material transportation cost.

The technical solutions adopted by the present invention to solve the technical problems includes: a surface loading system, an inclined shaft transportation system, and a downhole unloading system. The inclined shaft transportation system is configured between the surface loading system and the downhole unloading system. The inclined shaft transportation system includes a bottom unloading dumper, support guide wheels, a guide rail, a drive wheel, a reverse wheel and a traction steel wire rope arranged between the drive wheel and reverse wheel. The guide rail is racetrack-shaped. The inner edge of the guide rail is provided with a turn of the traction steel wire rope. The drive wheel and the reverse wheel are respectively engaged with two ends at an inner side of the guiding rail. One side of a bottom unloading dumper body is fixedly connected to the traction steel wire rope, and the other body side is engaged with the guide rail configured on an inner wall of an inclined shaft. The plurality of support guide wheels are arranged along the inner side of the guide rail, and an upper portion of each support guide wheel is fixed on the inner wall of the inclined shaft for the traction steel wire rope to pass through.

Compared with the prior art, the present invention has the following advantages. According to the present invention, the material vehicle is pulled by the steel wire rope to transport the solid backfilling material, which can steadily, continuously and efficiently transport the solid backfilling material from the surface to the down hole. Meanwhile, the material transportation system does not wears easily, has a long service life, can reduce the material transportation cost, and avoid the deficiencies of the existing inclined shaft material feeding system. The system operates steadily, has simple operations, high transportation efficiency, and low transportation cost, and has wide practicability.

BRIEF DESCRIPTION OF THE DRAWINGS

The present invention will now be further described hereinafter with reference to the drawings and embodiments.

In the figures.

1. surface stock bin, 2. surface conveyor, 3. traction steel wire rope, 4. bottom unloading dumper, 5. support guide wheel, 6. inclined shaft, 7. material unloading platform, 8.

full-stock alarm device, 9. downhole stock bin, 10. downhole conveyor, 11. drive wheel, 12. reverse wheel, 13. guide rail, 14. pressing plate, and 15. bolt.

DETAILED DESCRIPTION OF THE EMBODIMENTS

In order to clarify the objectives, the technical solutions, and the advantages of the embodiments of the present invention, the technical solutions in the embodiments of the present invention will be clearly and completely described hereinafter with reference to the drawings in the embodiments of the present invention. Obviously, the described embodiments are merely some of the embodiments of the present invention rather than all. All other embodiments derived by those of ordinary skill in the art based on the embodiments of the present invention without creative efforts fall within the scope of the present invention.

Figure 1:
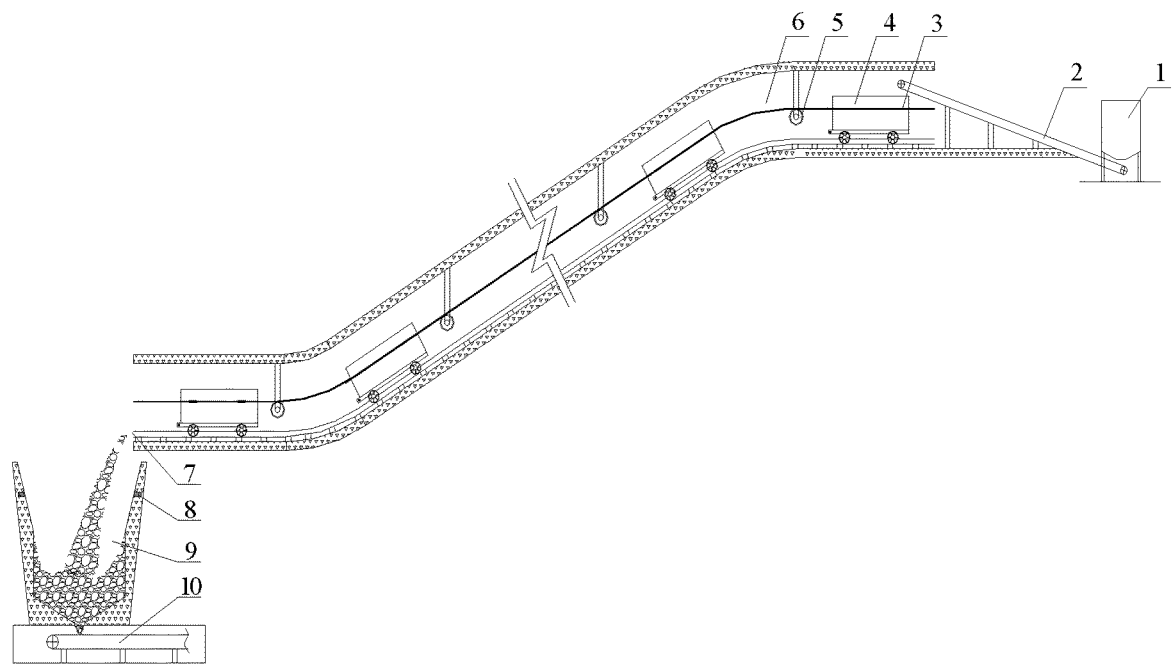
FIG. 1 is a front view of one embodiment of the present invention.
Figure 2:
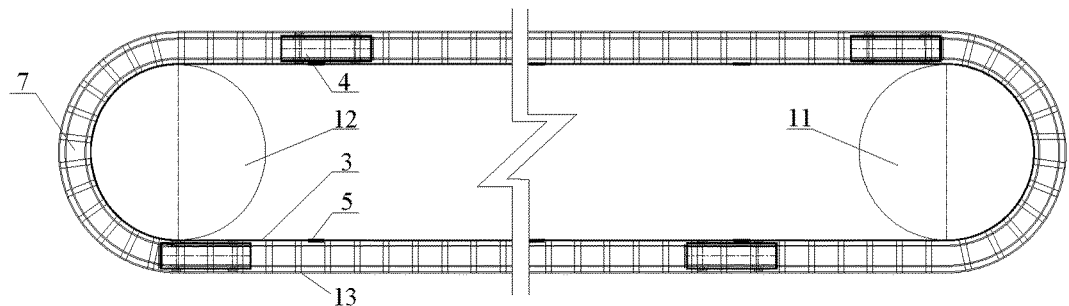
FIG. 2 is a top view in FIG. 1.
Figure 3:
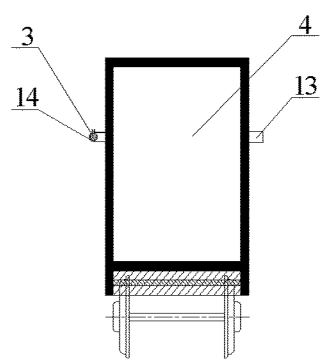
FIG. 3 is a front view of the bottom unloading dumper shown in FIG. 1.
Figure 4:
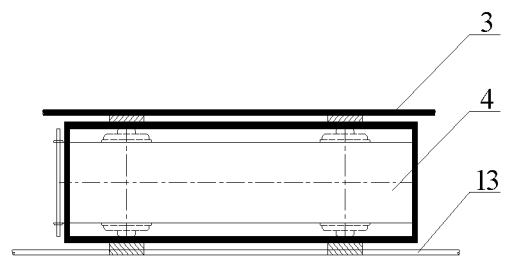
FIG. 4 is a top view of the bottom unloading dumper shown in FIG. 1.
Figure 5:
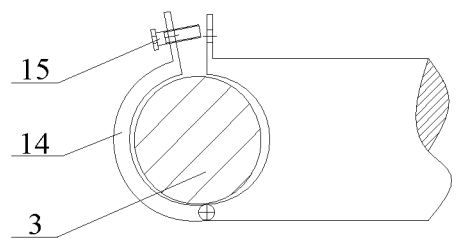
FIG. 5 is an enlarged view of the fixation and connection portion of the bottom unloading dumper and the traction steel wire rope shown in FIG. 1.

FIG. 1 and FIG. 2 show a front view and a top view respectively of the structural schematic diagrams of a preferred embodiment of the present invention. The figures show an inclined shaft continuous feeding system for solid backfilling materials, which includes a surface loading system, an inclined shaft transportation system, and a downhole unloading system. The surface loading system is configured on the ground. The downhole unloading system is configured underground. The inclined shaft transportation system is configured between the surface loading system and the downhole unloading system. The inclined angle of the inclined shaft 6 is determined according to factors such as the weight of the transported material and the friction coefficient of the floor of the inclined shaft, etc. The surface loading system includes a surface conveyor 2 and a surface stock bin 1 connected to the surface conveyor 2. The inclined shaft transportation system includes a bottom unloading dumper 4, support guide wheels 5, a guide rail 13, a drive wheel 11, a reverse wheel 12, and a traction steel wire rope 3 configured between the drive wheel 11 and the reverse wheel 12. The guide rail 13 is racetrack-shaped. The drive wheel 11 and the reverse wheel 12 are respectively engaged with two ends of the guide rail 13 at the inner side. Generally, the drive wheel 11 are installed at an end near the ground. Referring to FIGS. 3, 4 and 5, the bottom unloading dumper 4 is fixedly connected to the traction steel wire rope 3 by an engaging device composed of a pressure plate 14 and a bolt 15 installed on one side of the bottom unloading dumper body. Another side of the bottom unloading dumper body is engaged with the guide rail 13 configured on the inner wall of the inclined shaft 6 to guide the bottom unloading dumper 4 to run smoothly and steadily. Preferably, multiple bottom unloading dumpers 4 are provided, and the multiple bottom unloading dumpers 4 are connected to the traction steel wire rope 3 with the same interval. The support guide wheels 5 are equidistantly configured inside the inclined shaft 6, so as to support the traction steel wire rope 3 and guide the traction steel wire rope 3 for transmission, thereby preventing a deviation in the operation.

Figure 6:
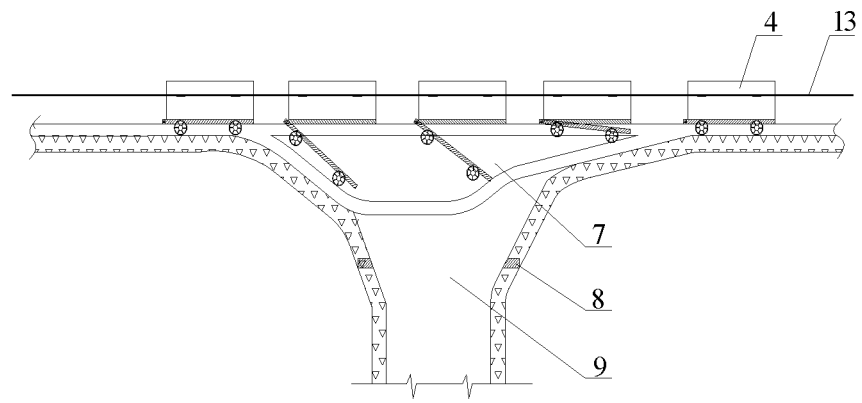
FIG. 6 is a structural schematic diagram showing the downhole unloading system shown in FIG. 1.

As shown in FIG. 6, the downhole unloading system described in this embodiment includes a material unloading platform 7, a downhole stock bin 9, a downhole conveyor 10, and an full-stock alarm device 8. The downhole stock bin 9 is configured below the material unloading platform 7, so that the bottom unloading dumper 4 can automatically unload the material to the downhole stock bin 9. The downhole material transportation is realized through the downhole conveyor 10 configured below the downhole stock bin 9. The full-stock alarm device 8 is configured on the upper portion of the inner wall of the downhole stock bin 9 to monitor the height of the materials piled up.

During operation, the solid backfilling material in the surface stock bin 1 is loaded into the bottom unloading dumper 4 by the surface conveyor 2, then the inclined shaft transportation system is started. When the drive wheel 11 rotate, the bottom unloading dumper 4 equidistantly connected to the traction steel wire rope 3 by the engaging device consists of the pressing plate 14 and the bolt 15 of is driven downward to the material unloading platform 7. Meanwhile, another side of the bottom unloading dumper body 4 is engaged with the guide rail 13 configured on the inner wall of the inclined shaft 6 to guide the bottom unloading dumper 4 to run smoothly and steadily. When the bottom unloading dumper 4 arrives at the material unloading platform 7, the materials are automatically unloaded to the downhole stock bin 9. After the bottom unloading dumper 4 completes the unloading, the bottom unloading dumper 4 is driven by the reverse wheel 12, and runs toward the drive wheel 11 configured on the ground to reload. This process is repeated and cycled. After the solid backfilling materials are unloaded to the downhole stock bin 9 through the material unloading platform 7, the downhole material transportation is realized by the downhole conveyor 10 configured below the downhole stock bin 9. At the same time, when the materials piled up in the underground stock bin 9 reaches a certain height, the full-stock alarm device 8 will send an alarm signal to the control room on the ground to automatically stop feeding.

The above embodiment is merely a preferred embodiment of the present invention, and is not intended to limit the present invention in any form. Any simple modification and equivalent change derived from the above embodiment according to the technical essence of the present invention falls within the scope of the present invention.

What is claimed is:

1. An inclined shaft continuous feeding system for solid backfilling materials, comprising: a surface loading system, an inclined shaft transportation system, and a downhole unloading system, wherein the inclined shaft transportation system is arranged between the surface loading system and the downhole unloading system; wherein, the inclined shaft transportation system comprises a bottom unloading dumper, a plurality of support guide wheels, a guide rail, a drive wheel, a reverse wheel, and a traction steel wire rope configured between the drive wheel and the reverse wheel; the guide rail is racetrack-shaped; the traction steel wire rope is provided on an interior side of the racetrack-shape of the guide rail; the drive wheel and the reverse wheel are respectively engaged with two ends of the guide rail at an inner side; a first side of a bottom unloading dumper is fixedly connected to the traction steel wire rope; a second side of the bottom unloading dumper is engaged with the guide rail configured on an inner wall of the inclined shaft; the plurality of support guide wheels are arranged on an interior side of the race-track shape; and an upper portion of each support guide wheel is fixed on the inner wall of the inclined shaft for the traction steel wire rope to pass through.

2. The inclined shaft continuous feeding system for the solid backfilling materials according to claim 1, wherein the surface loading system comprises a surface conveyor and a surface stock bin connected to the surface conveyor.

3. The inclined shaft continuous feeding system for the solid backfilling materials according to claim 2, wherein at least one bottom unloading dumpers are provided.

4. The inclined shaft continuous feeding system for the solid backfilling materials according to claim 3, wherein a plurality of bottom unloading dumpers are provided, and the plurality of bottom unloading dumpers are fixedly connected to the traction steel wire rope with a same interval.

5. The inclined shaft continuous feeding system for the solid backfilling materials according to claim 2, wherein the plurality of support guide wheels are equidistantly configured inside the inclined shaft.

6. The inclined shaft continuous feeding system for the solid backfilling materials according to claim 1, wherein the downhole unloading system comprises a material unloading platform, a downhole stock bin, and a downhole conveyor; a semicircle at an end of the guide rail located in downhole serves as the material unloading platform; the downhole stock bin is configured below the material unloading platform; and the downhole conveyor is configured below the downhole stock bin.

7. The inclined shaft continuous feeding system for the solid backfilling materials according to claim 6, wherein the downhole unloading system further comprises a full-stock alarm device, and the full-stock alarm device is configured on an upper portion of an inner wall of the downhole stock bin.

8. The inclined shaft continuous feeding system for the solid backfilling materials according to claim 7, wherein at least one bottom unloading dumpers are provided.

9. The inclined shaft continuous feeding system for the solid backfilling materials according to claim 8, wherein a plurality of bottom unloading dumpers are provided, and the plurality of bottom unloading dumpers are fixedly connected to the traction steel wire rope with a same interval.

10. The inclined shaft continuous feeding system for the solid backfilling materials according to claim 7, wherein the plurality of support guide wheels are equidistantly configured inside the inclined shaft.

11. The inclined shaft continuous feeding system for the solid backfilling materials according to claim 6, wherein at least one bottom unloading dumpers are provided.

12. The inclined shaft continuous feeding system for the solid backfilling materials according to claim 11, wherein a plurality of bottom unloading dumpers are provided, and the plurality of bottom unloading dumpers are fixedly connected to the traction steel wire rope with a same interval.

13. The inclined shaft continuous feeding system for the solid backfilling materials according to claim 6, wherein the plurality of support guide wheels are equidistantly configured inside the inclined shaft.

14. The inclined shaft continuous feeding system for the solid backfilling materials according to claim 1, wherein at least one bottom unloading dumpers is provided.

15. The inclined shaft continuous feeding system for the solid backfilling materials according to claim 14, wherein a plurality of bottom unloading dumpers are provided, and the plurality of bottom unloading dumpers are fixedly connected to the traction steel wire rope with a same interval.

16. The inclined shaft continuous feeding system for the solid backfilling materials according to claim 15, wherein the first side of the bottom unloading dumper is fixedly connected to the traction steel wire rope by a pressure plate and a bolt.

17. The inclined shaft continuous feeding system for the solid backfilling materials according to claim 1, wherein the plurality of support guide wheels are equidistantly configured inside the inclined shaft.

* * * * *